(12) United States Patent
Stanczak

(10) Patent No.: US 6,935,788 B2
(45) Date of Patent: Aug. 30, 2005

(54) METHOD AND DEVICE FOR ADJUSTING BEARING ASSEMBLY FOR A WHEEL HUB

(75) Inventor: Edmund A. Stanczak, St. Clair Shores, MI (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 323 days.

(21) Appl. No.: 09/973,741

(22) Filed: Oct. 10, 2001

(65) Prior Publication Data

US 2002/0196990 A1 Dec. 26, 2002

Related U.S. Application Data

(60) Provisional application No. 60/299,689, filed on Jun. 20, 2001, and provisional application No. 60/301,565, filed on Jun. 28, 2001.

(51) Int. Cl.⁷ ............................................... F16C 19/08
(52) U.S. Cl. ..................................................... 384/551
(58) Field of Search ................................. 384/551, 548, 384/563, 585, 474

(56) References Cited

U.S. PATENT DOCUMENTS

| | | | | |
|---|---|---|---|---|
| 5,785,434 A | * | 7/1998 | Rode | 384/551 |
| 6,283,639 B1 | * | 9/2001 | Rode | 384/551 |
| 6,505,972 B1 | * | 1/2003 | Harbottle et al. | 384/517 |

* cited by examiner

Primary Examiner—Lenard A. Footland
(74) Attorney, Agent, or Firm—Carlson, Gaskey & Olds

(57) ABSTRACT

A wheel hub assembly including first and second bearing assemblies positioned on opposite sides of a spacer. The spacer includes at least one opening to allow lubricant to flow through the spacer. The spacer includes a first section deformable such that an overall length of the spacer is reduced a predetermined amount in response to the application of a predetermined load to set a distance between the first and second bearing assemblies. The assembly further includes a spindle having external threads and a nut having internal threads engaged with the spindle to secure the bearing assemblies and spacer within the wheel hub assembly.

13 Claims, 4 Drawing Sheets

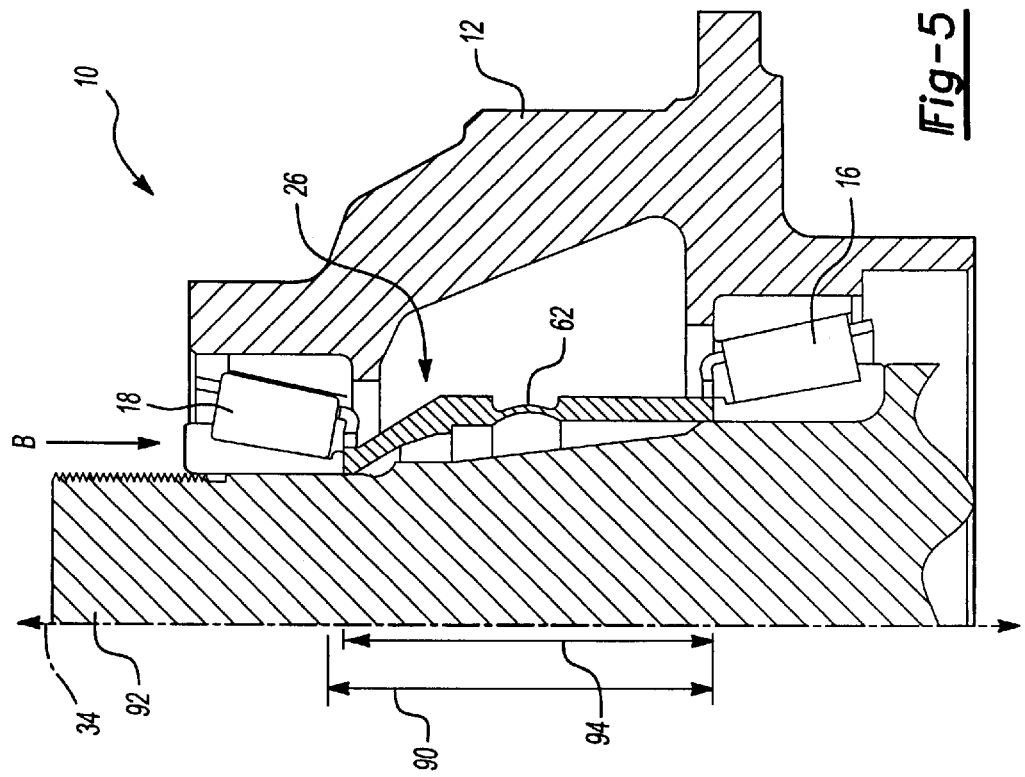
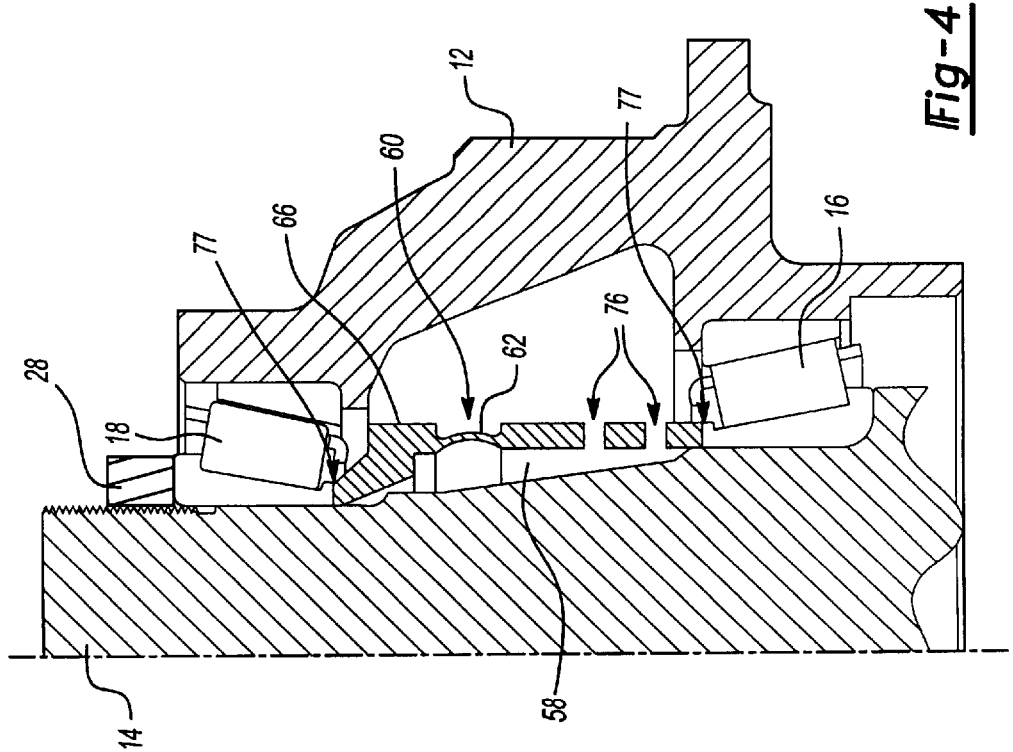

METHOD AND DEVICE FOR ADJUSTING BEARING ASSEMBLY FOR A WHEEL HUB

This application claims priority to provisional application serial No. 60/299,689 filed on Jun. 20, 2001 and provisional application Ser. No. 60/301,565 filed on Jun. 28, 2001.

BACKGROUND OF THE INVENTION

This invention relates to a method and device for adjusting the distance between inner and outer bearing assemblies of a wheel hub to assure proper and consistent alignment.

Typically, a wheel assembly will include inner and outer bearing assemblies to support rotation of a wheel hub about a spindle. A nut threaded onto corresponding threads of the spindle secures the wheel hub between bearing assemblies such that the wheel hub freely rotates on the bearing assemblies. The nut is fastened with sufficient torque to apply a predetermined amount of pressure to the bearing assemblies in order to properly support the wheel hub. Insufficient torque can cause misalignment of the wheel hub and premature wear on the bearing assemblies and excessive torque can cause excessive heat build up and damage to the bearing assemblies.

It is known in the art to provide a spacer between the inner and outer bearing assemblies to maintain a predetermined space between the inner and outer bearing assemblies no matter what torque is applied to the nut. The spacer is designed to be essentially incompressible under any load that can be exerted by tightening of the nut. The spacer, wheel hub and bearing assemblies are then assembled to the spindle where the nut is tightened to secure the wheel hub.

The spacer in such assemblies forms a cavity about the spindle. A leak resistant seal is formed between the bearing assemblies and the spacer because of the pressure exerted by the nut. The wheel hub is filled with lubricant for the bearings assemblies. The pressure between the spacer and the bearings prevents fluid from entering the cavity as the wheel hub is filled with lubricant. The result is that the level of lubricant is artificially high because of the empty unfilled space of the cavity. The lubricant reaches a fill line indicating that the wheel hub has been filled with the proper amount of lubricant, without actually having the required amount. The leak resistant seal between the spacer and the bearing assemblies allows lubricant to slowly enter the cavity thereby dropping the lubricant level. Insufficient lubricant in the wheel hub can lead to premature bearing assembly wear and failure.

For these reasons, it is desirable to develop a spacer to set the distance between bearing assemblies that will accommodate the proper lubrication of the bearing assemblies.

SUMMARY OF THE INVENTION

The subject invention is a method and device for adjusting the distance between bearing assemblies to assure proper and consistence alignment and provide for complete filling of lubricant within a wheel hub.

The subject invention provides a means of accurately and repeatedly setting the distance between bearing assemblies for a wheel hub assembly. Preferably the invention is used for wheel hub assemblies installed on heavy vehicles such as trucks and trailers pulled by such trucks. The invention includes a spacer assembled over the spindle and between the inner and outer bearing assemblies. The spacer may either be of a predetermined length machined to precise tolerances or a deformable spacer deformed under a load. The spacer with the predetermined machined length is machined to the precise length required for each specific application and configuration. The deformable spacer includes a first section having a wall thickness sized to deform a predetermined amount under a predetermined load. The amount of deformation changes an overall length of the spacer to set the distance between bearing assemblies. The spacers along with the bearing assemblies are then assembled to a spindle of the vehicle.

The spacer of this invention also includes at least one opening to provide for the free flow of lubricant through the spacer. The assembled spacer forms a leak resistance seal between the bearing assemblies that initially prevents oil from filling a cavity created about a wheel spindle. The opening position within the spacer allows lubricant to fill the cavity and thereby properly fill the wheel hub with lubricant. Further, the opening provides for the free flow of oil into and out of the cavity such that the bearings are supplied with the proper amount of lubricant during operation. The openings can be of any configuration including circular holes, slots and notches at the ends of the spacer. The only limitation being that the any opening must not weaken the spacer such that the spacer further deforms from pressure exerted by the nut.

The spacer disclosed of this invention accomplishes the adjustment of the bearing assemblies and provides for the proper lubrication of the bearing assemblies.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is cross section view of the wheel hub assembly and spacer; and

FIG. 5 is a cross section view of the wheel hub assembly on an assembly fixture.

DETAILED DESCRIPTION OF THE PREFERRED EMBODIMENT

Figure 1:
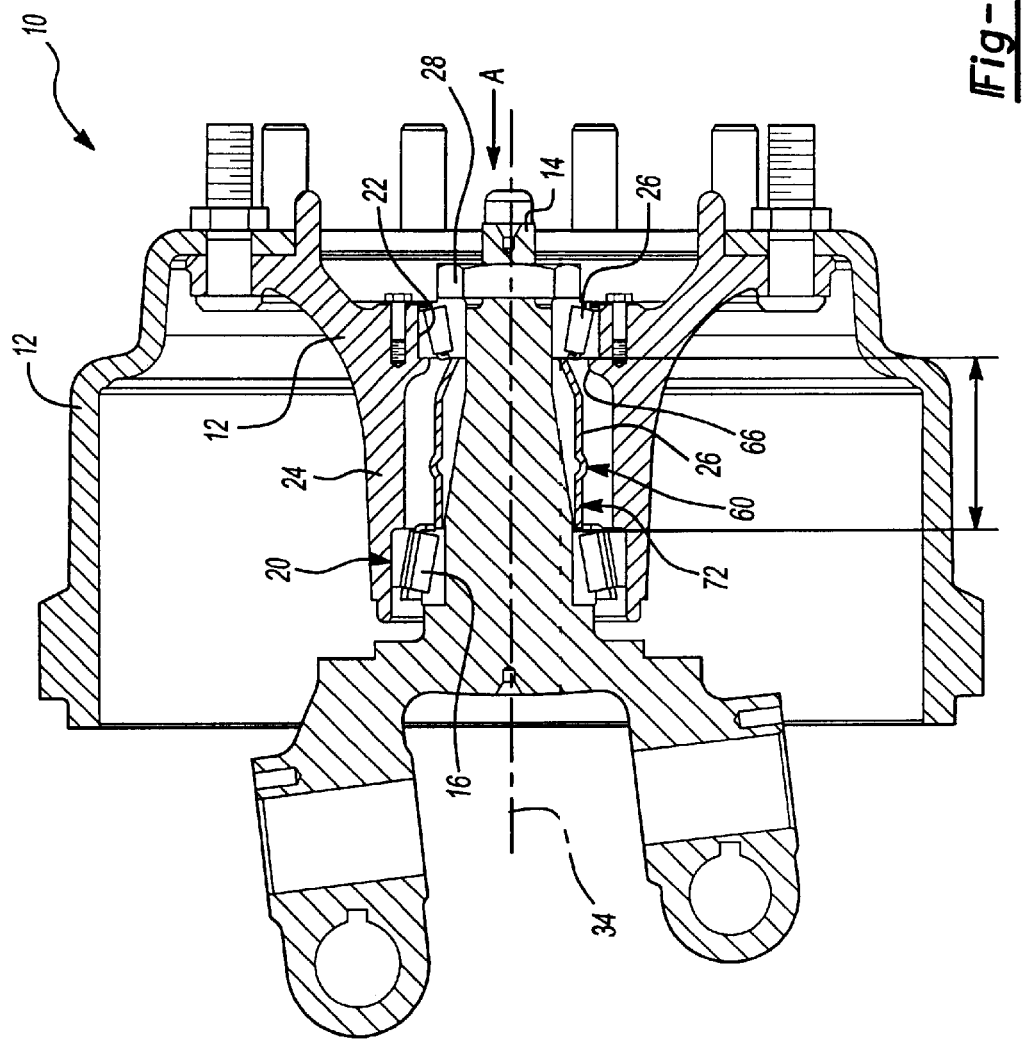
FIG. 1 is a cross section view of a non-driven wheel hub assembly.

Referring to the Figures, wherein like numerals indicate like or corresponding parts throughout the several views, the subject invention is a wheel hub assembly generally shown at 10 in FIG. 1. The wheel hub assembly 10 includes a wheel hub 12 rotatably supported on a spindle 14 by inner and outer bearing assemblies 16,18. The bearing assemblies 16,18 include inner and outer bearing cones 15, 17 installed onto the spindle to engage inner and outer bearing cups 20,22 pressed into a central portion 24 of the wheel hub 12. A spacer 26 is in load bearing contact between the inner and outer bearing assemblies 16,18. Internal threads of a nut 28 engage external threads of the spindle 14 to secure the wheel hub assembly 12 to the spindle 14. The tightened nut exerts an axial force, indicated by arrow A along an axis 34 through the outer bearing assembly 18, the spacer 26, the inner bearing assembly 16 and finally to the spindle 14. The spacer 26 limits a length 32 between the inner and outer bearing assemblies 16,18 such that regardless of the torque applied to the nut 28, proper pressure will be exerted between the wheel hub 12 and the bearing assemblies 16,18.

Figure 2:
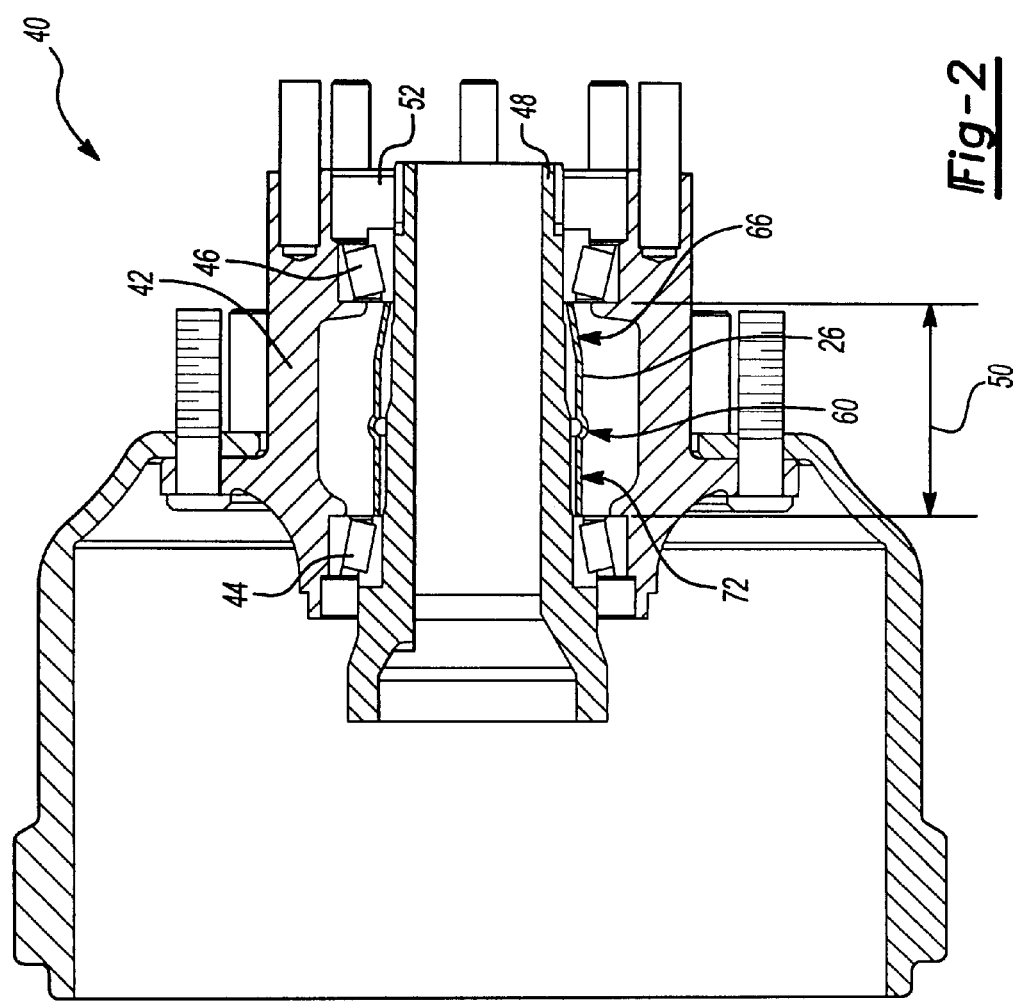
FIG. 2 is a cross section view of a driven wheel hub assembly.

Referring to FIG. 2, a competed wheel hub assembly for a driven axle is generally indicated at 40. The wheel hub assembly 40 includes a wheel hub 42 supported by inner and outer bearing assemblies 44, 46. The spacer 26 is set over a driven axle 48. As in the previous embodiment the spacer 26 sets a length 50 between the inner and outer bearing assembly 44,46 such that regardless of the torque applied to tighten nut 52, the pressure between the wheel hub 42 and the bearing assemblies 44,46, will be consistent. The length 50 between the wheel bearing assemblies 44,46 is set to control the pressure exerted between the wheel hub 42 and the wheel bearing assemblies 44,46.

Figure 3:
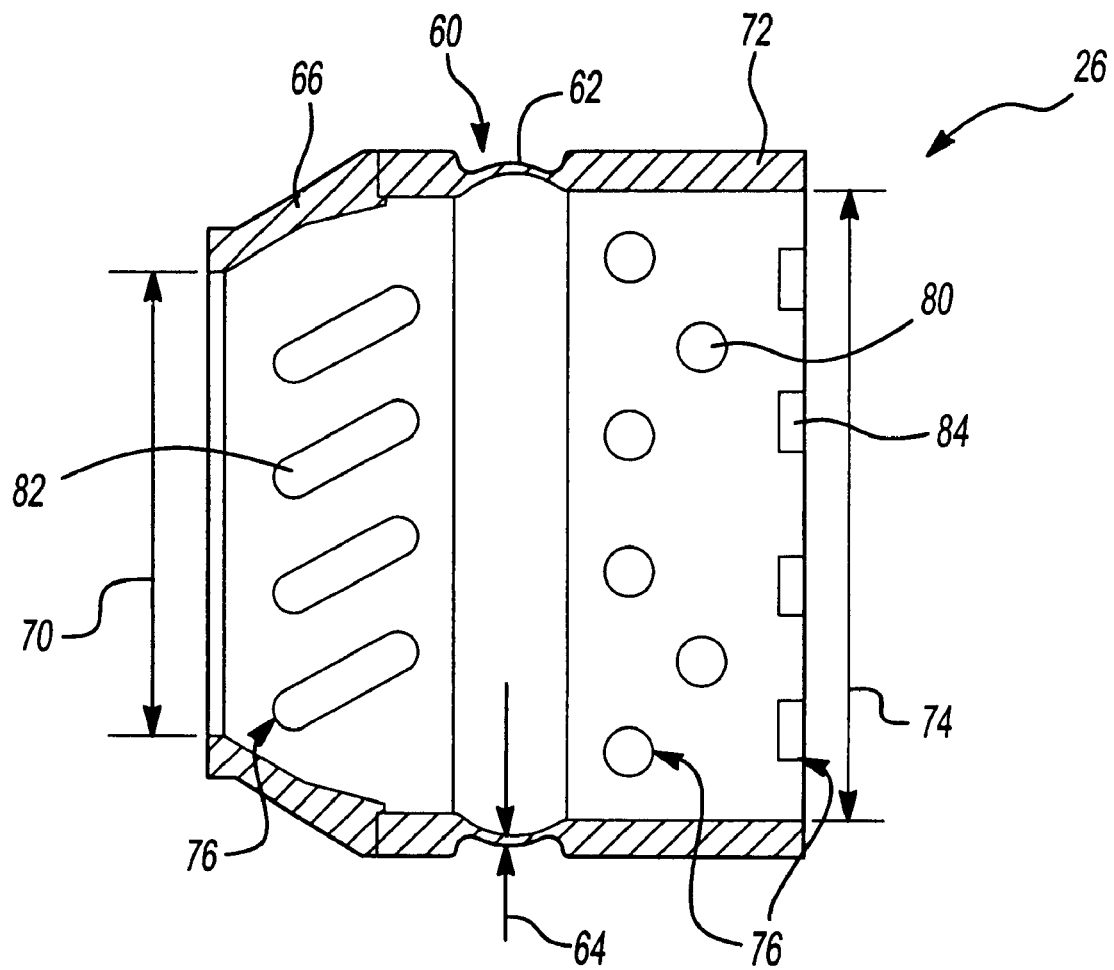
FIG. 3 is a cross section view of a spacer.

Referring to FIG. 3, the spacer 26 is shown independent of the wheel hub assemblies 10, 40. The spacer shown in FIG. 3 is a deformable type spacer, it is within the contemplation of this invention to use a fixed length non-deformable spacer. The spacer 26 includes a first section 60 having a thin wall 62. The thin wall 62 is of such a thickness 64 to yield a predetermined amount from an original length in proportion to a specific load. Preferably, the first section is annular and semi-spherical in shape. A worker skilled in the art would understand that other shapes could be used for the first section 60. Further, different assembled lengths of the spacer 26 are obtained by varying the load applied or by varying the thickness 64 of the thin wall 62.

A second section 66 includes a taper 68 to a first diameter 70. A third section 72 is cylindrical in shape and includes a second diameter 74 sized to fit over the spindle of the driven or non-driven axle and to contact a load-bearing portion of the bearing assemblies 16,18. A worker in the art will understand that the diameters 70,74 are dependent on the specific application and various configurations would fall within the contemplation of this invention.

Referring to FIGS. 3 and 4, the spacer 26 includes a plurality of openings 76 disposed in the second and third sections 66, 72 of the spacer 26. Pressure applied by the nut 28 creates a leak resistant seal between the spacer 26 and the bearing assemblies 16,18. Absent the openings 76, the leak resistant seal 77 would prevent lubricant from entering a cavity 78 formed between the spindle 14 and the spacer 26. This condition would initially prevent lubricant from fully filling the wheel hub 12 because lubricant would not enter the cavity 78. The openings 76 provide for the flow of lubricant into and out of the cavity 78 such that upon initial fill of the wheel hub 12, a true level of lubricant is indicated. Further, the openings 76 are necessary to prevent lubricant from seeping into the cavity 78 and becoming trapped, thereby reducing the amount of lubricant available for lubrication of the bearing assemblies 16,18.

The openings 76 can be holes 80, slots 82 or notches 84. In this embodiment the slots 82 are disposed in the second section 66 and the holes 80 are disposed in the third section 72. Preferably, the openings are disposed within the second and third sections 66, 72, however the openings 76 may be disposed within any non-deforming section of the spacer 26. These openings allow lubricant to fill the cavity 78 as the wheel hub 12 is filled and substantially eliminate potential oil starvation of the bearing assemblies 16,18. The openings 76 can be of any shape or configuration that does not reduce the structural integrity of the spacer 26.

The invention includes a method of adjusting a length 90 between bearing assemblies 16,18. Referring to FIG. 5, the wheel hub assembly 10 is shown in cross section. The method includes the installation of the spacer 26 between the inner and outer bearing assemblies 16,18, along with the wheel hub 12 onto a fixture 92. The fixture 92 is of the same size and configuration as a spindle or drive axle to which the wheel hub assembly 10 is to be installed. A force, indicated by arrow B, along the axis 34 is applied to the outer bearing assembly 18. The magnitude of the force is predetermined to exert sufficient pressure to deform the spacer 26 at the thin wall 62 a predetermined level. In response to the predetermined level of force, the length 90 of the spacer 26 is changed to a deformed length 94. The deformed length 94 is the proper distance between the bearing assemblies 16,18 for that particular wheel hub 12. The bearing assemblies 16,18, and deformed spacer 26, along with the wheel hub 12 are then assembled to the spindle 14 of the driven 48 or non-driven axle of the vehicle.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A wheel hub assembly comprising:

first and second bearing assemblies;

a spacer disposed between said bearing assemblies;

said spacer defining at least one opening such that lubricant may flow through said spacer, wherein said opening is a notch disposed at end of said spacer.

2. The assembly of claim 1, wherein said spacer includes a first section deformable such that an overall length of said spacer is reduced a predetermined amount in response to the application of a predetermined load to set a distance between said first and second bearing assemblies.

3. The assembly of claim 2, further comprising first and second sections adjacent said first section, said first section comprising a wall thickness less than a thickness of said second and third sections such that said first section deforms under a specified load.

4. The assembly of claim 1, wherein said spacer further includes second and third sections and said opening is disposed in one of said second and third sections.

5. The assembly of claim 4, wherein said second section of said spacer includes a first diameter sized to abut said first bearing assembly, and said third section includes a second diameter sized to abut said second bearing assembly.

6. The assembly of claim 1, wherein said opening is circular.

7. The assembly of claim 1, wherein said opening is a slot.

8. The assembly of claim 1, further comprising a plurality of said openings.

9. The assembly of claim 1, further including an axle having external threads and a nut having internal threads engaged with said axle to secure said bearing assemblies and said spacer within said wheel hub assembly.

10. A spacer for setting a distance between first and second bearing assemblies within a wheel hub, said spacer comprising;

first and second ends to contact said bearing assemblies;

a first section deformable such that an overall length of said spacer it reduced a predetermined amount in response to the application of a predetermined load to set a distance between said first and second hearing assembling;

second and third sections adjacent said first section said first section comprising a wall thickness less than a wall thickness of said second and third sections such that said first section deforms under a specified load to set a distance between said first and second heating assemblies; and a least one opening defined by said spacer to allow free flow of lubricant within said wheel hub, wherein said opening is disposed in one of said second and third sections.

11. The assembly of claim 10, wherein said opening is circular.

12. The assembly of claim 10, wherein said opening is a slot.

13. A spacer for setting a distance between first and second hearing assembling within wheel hub, said spacer comprising:

first and second ends to contact said first and second hearing assemblies; and a least one opening defined by said spacer to allow free flow lubricant within said wheel hub, wherein said opening is a notch disposed at an end of said spacer.

* * * * *

UNITED STATES PATENT AND TRADEMARK OFFICE
CERTIFICATE OF CORRECTION

PATENT NO. : 6,935,788 B2
DATED : August 30, 2005
INVENTOR(S) : Stanczak

It is certified that error appears in the above-identified patent and that said Letters Patent is hereby corrected as shown below:

Column 5,
Line 5, "assembling" should read -- assemblies --.

Column 6,
Line 7, "hearing" should read -- bearing --.
Line 7, "assembling" should read -- assemblies --.
Line 7, "within wheel" should read -- within a wheel --.
Line 10, "hearing" should read -- bearing --.

Signed and Sealed this

Seventh Day of February, 2006

JON W. DUDAS
*Director of the United States Patent and Trademark Office*